July 18, 1933.  E. E. OEHMICHEN  1,919,121
ARRANGEMENT OF SUSTAINING PROPELLERS IN AERIAL NAVIGATION MACHINES
Filed Jan. 27, 1932   2 Sheets-Sheet 1

Inventor
Etienne E. Oehmichen,
By Marion & Marion
Attoreys.

July 18, 1933.　　　　E. E. OEHMICHEN　　　　1,919,121
ARRANGEMENT OF SUSTAINING PROPELLERS IN AERIAL NAVIGATION MACHINES
Filed Jan. 27, 1932　　　2 Sheets-Sheet 2
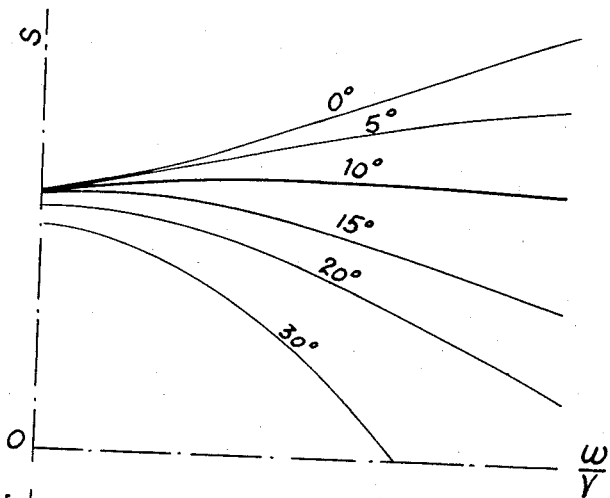
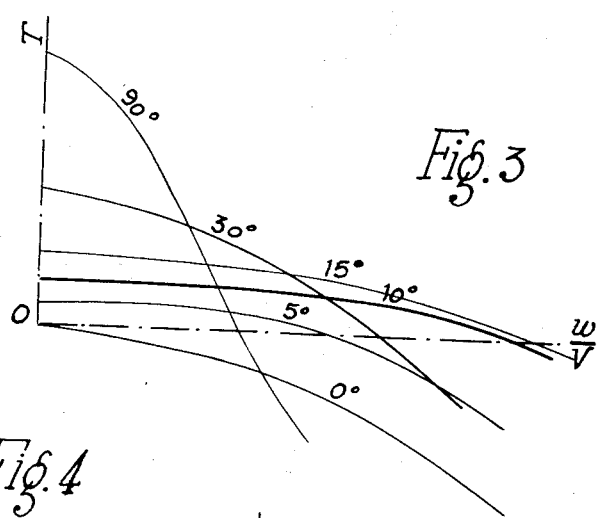
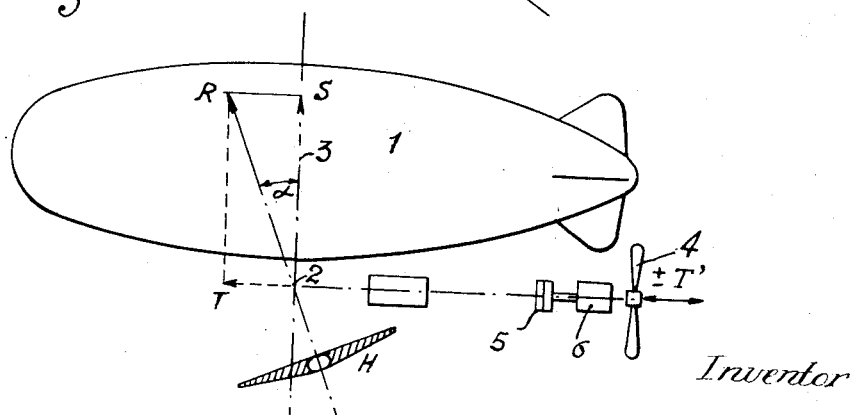
Inventor
Etienne E. Oehmichen,
By Marion & Marion
Attorneys.

Patented July 18, 1933

1,919,121

UNITED STATES PATENT OFFICE

ETIENNE EDMOND OEHMICHEN, OF VALENTIGUEY, FRANCE

ARRANGEMENT OF SUSTAINING PROPELLERS IN AERIAL NAVIGATION MACHINES

Application filed January 27, 1932, Serial No. 589,277, and in France February 3, 1931.

The present invention relates to an arrangement of sustaining propellers in aerial navigation machines, the said arrangement being based on certain phenomena which have a general feature hitherto not yet observed. I have recognized these phenomena during my personal practice of sustaining propellers driven by an engine of constant rotation speed and exposed to a wind of variable intensity whatever may be the angular relation between the direction of the wind and the axis of rotation of the said propellers.

For greater clearness of the principle, the annexed drawings show by way of example several results of experimental investigation and several embodiments of the machines according to the arising principles.

Fig. 2 shows the curves of power varying according to the angle of incidence of the said propeller.

Fig. 3 shows the curves of traction under the same conditions.

Fig. 4 is a diagrammatic view of an embodiment of the invention realized in a machine of the mixed type.

Figure 1:
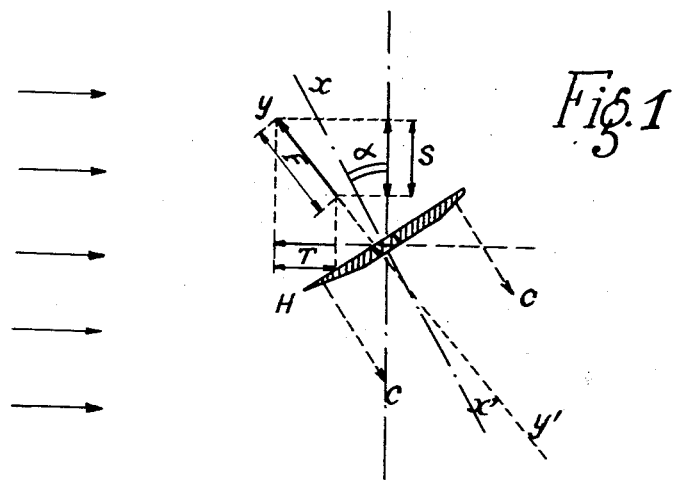
Fig. 1 is a diagrammatic view of the forces in the case of a propeller inclined with respect to the direction of a relative wind.

Referring to the drawings, Fig. 1 shows a propeller H inclined with respect to the direction of a relative wind R and turning about an axis, $xx'$, the direction of the total effort produced by the propeller being $yy'$, generally different from $xx'$. The angle of incidence of the propeller is $\gamma$ and the direction of driving zero wind is C. The entire developed effort is F; the sustaining component or simply the component of sustentation S is the projection of F upon the normal to the wind; the tracting component or simply the component of traction is the projection T of F upon the direction R of the relative wind.

Fig. 2 shows by a series of curves the variation of the carrying capacities according to the angles of incidence: 0°, 5°, 10°, 15°, 20° and 30° and as a function of the horizontal translation speed with constant rotation speed of the propeller, the ordinates according to the axis OS representing the values of S (Fig. 1) and the abscissæ according to the axis O:W/V representing the relative translation speeds obtained by dividing W, the horizontal translation speed, through V, the peripheric speed of the propeller.

Fig. 3 shows by a series of curves the variations of tractions as a function of the horizontal translating speed with constant speed of the propeller, the ordinates according to the axis OT representing the values of T (Fig. 1) and the abscissæ according to the axis O:W/V as before the relative translation speeds. The curves are drawn in relation to the following angles of inclination of the propeller: 0°, 5°, 10°, 15°, 30° and 90°.

On examining the curves it will be immediately seen that the usual sustaining propellers (incidence 0°) are not suitable in a helicopter machine, since the lifting varies (Fig. 1) according to the translation speed. In order to ensure a constant ascension with such a kind of propellers, it would seem indeed sufficient to vary the incidence of the whole machine by an angle that may reach and in some cases even exceed 10°, while in the case of an ordinary aeroplane it would be sufficient to vary the incidence only by 1° to 2° in order to ensure its constant ascension.

The reasons of this difference result from the following fact: On one hand, the angle of normal incidence of the aeroplane is extremely slight and on the other hand its speed divergency, that is to say the relation between its maximum speed and its minimum speed during the horizontal flight is a definite magnitude. The said speed divergency is in the contrary, infinite in the case of the helicopter which is capable of ascending without any horizontal translation speed.

Finally, when the incidence $\alpha$ of the sustaining propeller is zero, it will be necessary as its horizontal speed increases, to diminish in proportion either its angular speed or the incidence of its blades.

As it may be seen from the examination of the curves in Fig. 2, an incidence of 10° with a chosen type of propeller gives on the contrary a substantially constant ascension, what ever may be the horizontal translation speed.

As to the traction effort T developed by this propeller, it will appear from Fig. 3 that although this effort is ever so slight, it does not disappear and becomes subsequently negative solely in the case of a very high propulsive speed, the said speed being in every case considerably superior to a speed which would cause it to be annulled if the incidence of the propeller were 90° as in the case of an ordinary aeroplane.

This very remarkable phenomenon of paradoxal appearance may easily be explained by the theory.

When the incidence $\alpha$ reaches 15°, it will be seen that beginning with a predetermined speed the sustaining effort S decreases rapidly and that a propeller of the said incidence will not be more suitable than a propeller of 0° incidence as in the case of a helicopter.

According to the present invention, the above mentioned principles are applied to an aerial navigation machine which is constituted in the following manner:

The machine is lifted by means of one or a plurality of sustaining propellers, the axis or axes of rotation thereof forming during the horizontal flight with the absolute vertical an angle $\gamma$ such as to ensure the constant ascension, whatever may be the horizontal propulsive speed, the rotation speed of each propeller remaining however constant.

This angle amounts to approximately 10° in the case of ordinary sustaining propellers, that is to say in the case of propellers the pitch thereof oscillating between 0.25 D and 0.55 D (D being the exterior diameter of the propeller).

This angle may easily be determined by an experiment on a reduced model according to the known principles of this kind of tests in the current of a wind tunnel, varying the speed of the wind for each incidence of the propeller and bearing in mind that the sustaining effort S depends substantially solely on the proportion V/W' (V being the peripheric speed of the propeller and W' the speed of the wind).

On account of the principles of similitude it will be sufficient that the model has a substantially constant ascension for all the values of V/W' which are to be found in practice with effective flying machines.

The sustaining propellers are arranged in the machine so that their axes are parallel to the direction that corresponds to the so called constant ascending incidence and that the resulting effort produced by them passes substantially in the centre of gravity of the machine.

Fig. 4 shows by way of example an embodiment of the present invention in a machine of the mixed type.

From this figure, will be understood that the machine comprises a gas chamber or balloon 1, containing a light gas developing a portion of the total sustaining force and permitting the application of propellers H of a small diameter which may be solely utilized in practice as mechanically driven sustaining elements, thus ensuring at the same time the safety of the passengers in case of stopping of the engine.

The resulting effort R of the sustaining propellers will intersect the vertical line, connecting the centre of gravity 2 to the centre of aerostatic lift 3, beneath the latter centre and preferably in the immediate neighbourhood of the general centre of gravity 2.

Since the horizontal traction effort T developed by the propellers H of equally slight incidence is of a slight value, it is necessary to provide an auxiliary propelling element 4, capable of supplying the additional traction effort required by the passive resistances of the machine during the different propulsive speeds.

This propelling element must be able to develop efforts which may vary as to magnitude and direction in order to permit:

1. The immovability of the machine by developing a horizontal effort T' equal and opposite to T, whatever may be the value of T which depends itself on the value of sustaining effort S.

2. The control of the algebraic sum T+T' in order to realize any possible propulsive speeds between zero and the outmost maximum and to develop braking efforts, capable of slackening the machine in a very rapid manner and eventually to fly backwards in the present case: (T<T').

The auxiliary propelling element 4 will preferably consist of a reversible varying pitch propeller. It may be observed that in the case of utilization as brake, it will not absorb any motor power, for if the incidence of the blades is suitable, it can enter into autorotation developing an important braking component.

If it is desired to stop the machine in full speed in a rapid manner, it is therefore advantageous to disengage the propeller, that is to say to separate it from the transmission by a suitable member 5; the incidence of the blades remaining the same, the propelling element enters in autorotation and brakes the machine.

If the effort persists after the stopping operation, the machine may run backwards.

It is preferable to make the axis of the propelling element 4 to pass through the centre of gravity 2 of the machine. This condition, however, it not absolutely indispensable. It is no more necessary that this axis be horizontal and it may even be advantageous to incline it in order to compensate or on the contrary to produce variations of the total ascensional effort.

Finally, the propelling element 4 may not be of the type of variable pitch. It may be arranged for example in such a manner that it will be possible by means of any suitable driving device to vary its effects by changing its rotational speed. By employing flat or symmetrical blades recognized by the inventor to be comparable to the dissymmetrical blades, it will even be possible to utilize it for the backward flight by reversing its running. The gear 5 will then accompany it by a reversal running device 6.

It may be observed that this arrangement of sustaining propellers H and the auxiliary propelling element 4 permits to obtain a very interesting mechanical resistance as far as it permits to realize a disposition of the whole unit of slight incumbrance and relatively very small weight.

Figure 5:
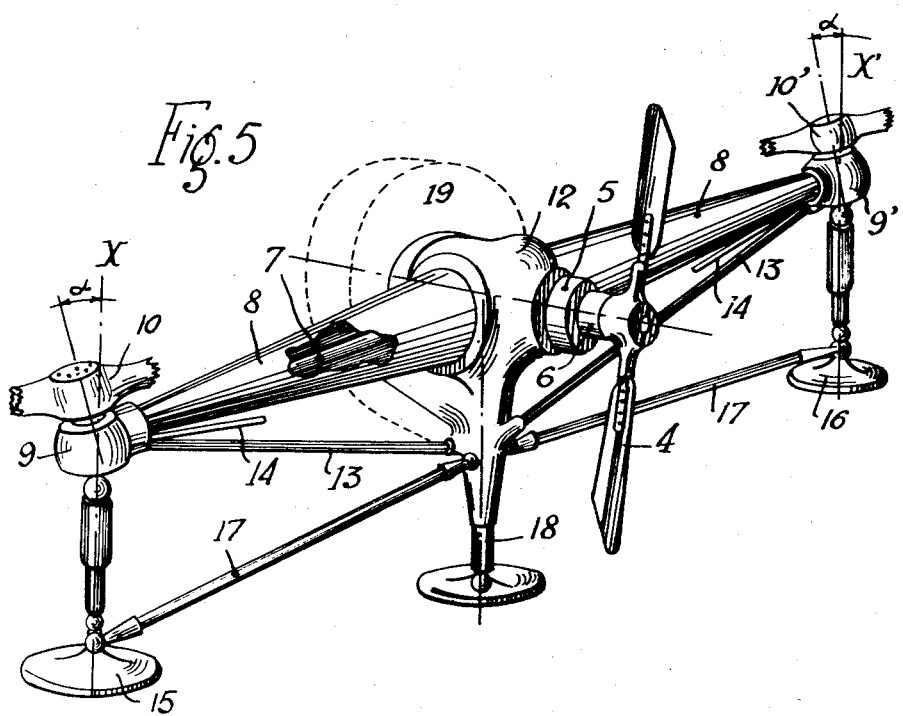
Fig. 5 is a particular view of a mechanism comprising two sustaining propellers.

Fig. 5 shows by way of example an embodiment of such a unit comprising two sustaining propellers turning in opposite directions.

As shown, a single horizontal shaft 7 is disposed in a resisting tubular case 8 similar to a rear axle in motor vehicles. Angular gears located in cases 9, 9' drive the propellers 10 and 10' which may advantageously turn in opposite directions.

The movement of the propelling element 4 is caused by the driving gear of the shaft 7 or by a special gear associated with the latter or even by the prolongation of the shaft 11 driven by the engine. The housing 12 of the transmission gearings of the shaft 7 supports the driving means of the propelling element 4 and may also serve to support the propelling element 19. The same housing may even be utilized to carry the engine proper and constitutes therefore a kind of nodal point, the mechanical resistance thereof may be rendered very great without increasing the total weight, since this remarkable point is unique in the whole machine and serves multiple purposes.

If the propellers 10 and 10' are disposed at a suitable distance from one another, the propelling element 4 may be fixed on the housing 12 so that the transmission is reduced to a single main shaft 7 acting directly on the principal members.

Since the extremities of the tubular case 8 are firmly fixed points due either to the proper resistance of the case or to the adjunction of high resisting braces such as 13 and 14, it is quite advisable to adjust thereupon the extremities of the landing gears 15 and 16, the pipes 17 thereof being pivotally mounted on the housing 12.

A supplementary safety landing gear 18 may bear upon this housing. The whole unit constitutes a condensed or slightly incumbering block which is considerably less sensible to shocks and deformations than any other system with multiple transmission.

Obviously, this invention is not limited by the embodiments described and represented solely by way of example for the applications of the invention, which comprises all variations and also any other aerial navigation machines wherein the above mentioned principles are applied.

What I claim is:

1. In an aerial navigation machine, an arrangement for sustaining and propelling the machine, wherein the sustaining effort is independent of the propulsive speed; said arrangement comprising a propeller system having an axis constructionally inclined at an angle approximating 10° with respect to the vertical plane transverse to the axis of the machine, and developing simultaneously a suspension and traction effort, the axis of said propeller system being fixed and passing through the general center of gravity of the machine; and, disconnectible auxiliary propelling means having a variable action and capable of developing traction and braking efforts.

2. In an aerial navigation machine, a balloon body containing a light gas, susceptible of partially equilibrating the total weight of the machine; an arrangement for sustaining and propelling the machine, wherein the sustaining effort is independent of the propulsive speed, said arrangement comprising a propeller system having an axis constructionally inclined at an angle approximating 10° with respect to the vertical plane transverse to the axis of the machine, and developing simultaneously a suspension and traction effort, the axis of said propeller system being fixed and passing through the general center of gravity of the machine; and, disconnectible auxiliary propelling means having a variable action and capable of developing traction or braking efforts.

3. In an aerial navigation machine, a balloon body containing a light gas, susceptible of partially equilibrating the total weight of the machine; an arrangement for sustaining and propelling the machine, wherein the sustaining effort is independent of the propulsive speed, said arrangement comprising a pair of propellers having their axes constructionally inclined at an angle approximating 10° with respect to the vertical plane transverse to the axis of the machine, and developing simultaneously a suspension and traction effort, the axes of said propellers being fixed and passing through the general center of gravity of the machine; a housing carrying said propellers at its opposed extremities; a motor for driving said propellers and affixed to the housing; and, a disconnectible auxiliary propeller having a variable action and capable of developing traction or braking efforts, said auxiliary propeller being driven by said motor and supported on said housing.

4. In an aerial navigation machine, a balloon body containing a light gas, susceptible of partially equilibrating the total weight of the machine; an arrangement for sustaining and propelling the machine, wherein the sustaining effort is independent of the propulsive speed, said arrangement comprising a pair of propellers having an axis constructionally inclined at an angle approximating 10° with respect to the vertical plane transverse to the axis of the machine, and developing simultaneously a suspension and traction effort, the axes of said propellers being fixed and passing through the general center of gravity of the machine; a housing carrying said propellers at its opposed extremities; a motor for driving said propellers and supported on said housing; a disconnectible auxiliary propeller having a variable action and capable of developing traction or braking efforts, said auxiliary propeller being driven by said motor and supported on the housing; and, a landing gear suspended from said housing.

ETIENNE EDMOND OEHMICHEN.